Figure 1:
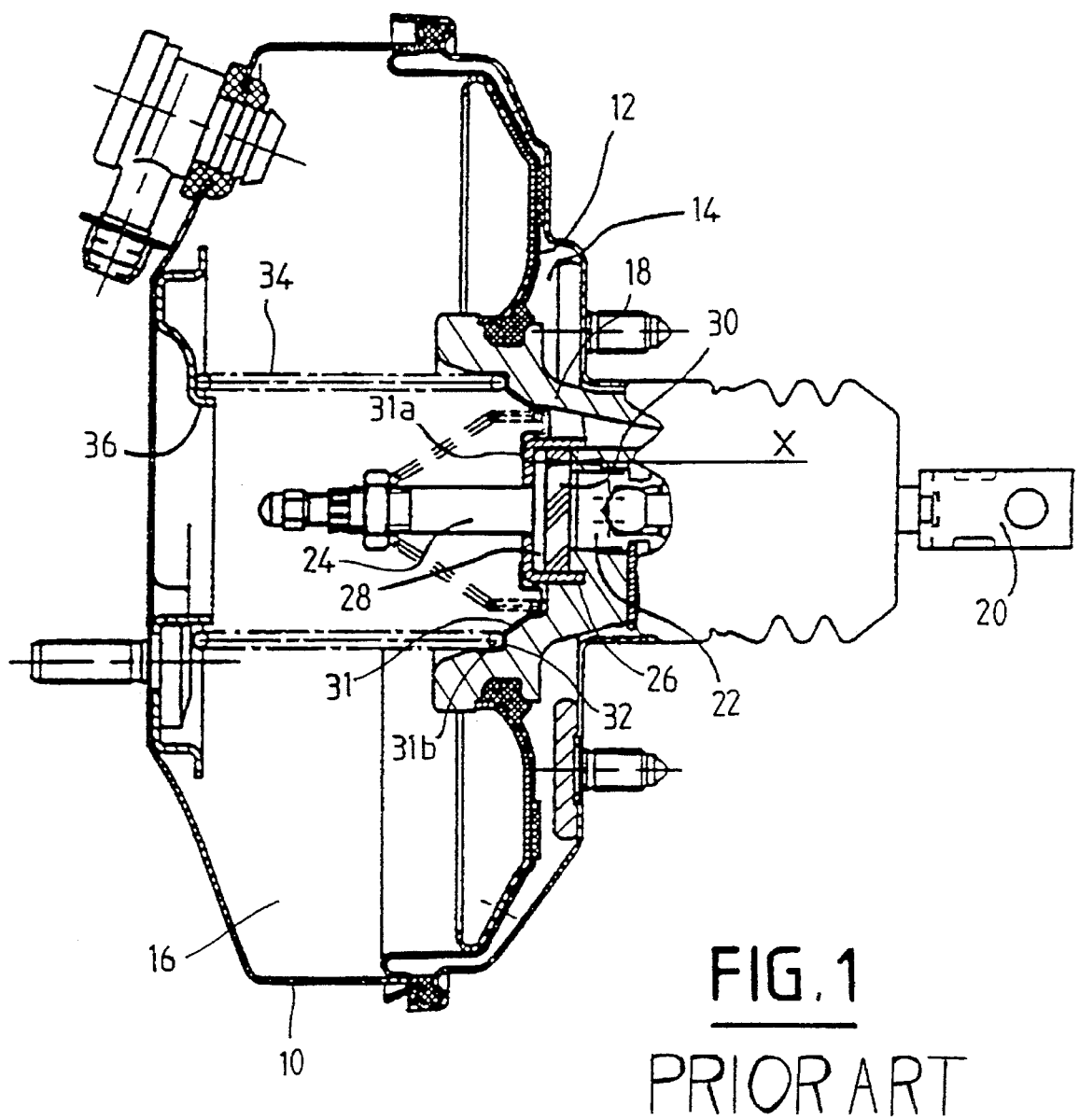

United States Patent [19]
Gautier et al.

[11] Patent Number: 5,476,032
[45] Date of Patent: Dec. 19, 1995

[54] BRAKE-BOOSTER OF THE PARTIAL VACCUM TYPE

[75] Inventors: Jean-Pierre Gautier; Ulysse Verbo, both of Aulnay Sous Bois; Miguël Perez-Revilla, Argenteuil, all of France

[73] Assignee: AlliedSignal Europe Services Techniques, Drancy, France

[21] Appl. No.: 122,554

[22] PCT Filed: Sep. 22, 1993

[86] PCT No.: PCT/FR93/00916

§ 371 Date: Sep. 30, 1993

§ 102(e) Date: Sep. 30, 1993

[87] PCT Pub. No.: WO94/07725

PCT Pub. Date: Apr. 14, 1994

[30] Foreign Application Priority Data

Oct. 7, 1992 [FR] France ................................. 92 11864

[51] Int. Cl.[6] .................................................. F15B 9/10
[52] U.S. Cl. ........................................ 91/376 R; 92/48
[58] Field of Search ................... 91/369.1, 369.2, 91/369.3, 376 R; 92/48, 96

[56] References Cited

U.S. PATENT DOCUMENTS

| 4,506,592 | 3/1985 | Shimamura | 92/101 |
| 4,587,884 | 5/1986 | Tsuboughi | 91/376 R X |
| 4,757,748 | 7/1988 | Kawasumi et al. | 91/369.2 |
| 4,970,940 | 11/1930 | Boehm et al. | 91/369.2 |
| 5,076,142 | 12/1991 | Steer et al. | 91/369.3 |
| 5,176,063 | 1/1993 | Levrai et al. | 91/369.2 |
| 8,572,055 | 2/1986 | Schiel | 91/369.2 |

FOREIGN PATENT DOCUMENTS 2112886  7/1983  United Kingdom .................. 91/369.2

*Primary Examiner*—Edward K. Look
*Assistant Examiner*—Hoang Nguyen
*Attorney, Agent, or Firm*—Larry J. Palguta; Leo H. McCormick, Jr.

[57] ABSTRACT

The invention relates to a removable thrust rod in a brake-booster of the partial vacuum type. The thrust rod (24) is attached securely to a skirt-shaped component (42) which surrounds the reaction disk (30) and to a component (44). A detachable component (50) comprises clipping fingers (54) which interact with the periphery of the component (44) and an annular part (52) which is flattened onto the piston (18) of the booster by a return spring (34).

3 Claims, 2 Drawing Sheets

BRAKE-BOOSTER OF THE PARTIAL VACCUM TYPE

The present invention has as its subject a brake-booster of the partial vacuum type.

The fitting of a brake-booster is very widespread in motor vehicles. As is well known, it permits the driver to actuate the brake system by exerting a force distinctly lower than that which would be necessary in the absence of assistance.

In order to give a better understanding of the invention, a known booster of the partial vacuum type will first be described with reference to the accompanying FIG. 1.

The booster consists of a casing 10 in which is mounted a deformable diaphragm 12 which separates the casing into a back chamber 14 and a front chamber 16. The central part of the diaphragm is securely attached to a movable piston 18 whereas its periphery is securely attached to the wall of the casing. The booster is actuated by the driver with the aid of a control rod 20 connected to the brake pedal not shown. The end of the control rod 20 is connected to a plunger 22 which is slideably mounted inside the piston 18. The control rod 20 makes it possible by means, not shown in the figure, either to place in communication the back chamber 14 and front chamber 16, the two chambers thus being under a partial vacuum, or to connect the back chamber 14 to a source at atmospheric pressure in order effectively to obtain the assisted braking. The braking action is transmitted to the master cylinder, not shown in the figure, through the intermediary of a thrust rod 24 disposed in the casing 10. The thrust rod 24 in the known systems is securely attached to the piston 18 through the intermediary of a ring 26 which is applied against a disk-shaped component 28 securely attached to one end of the thrust rod and which is applied against a reaction disk 30. As is well known, a certain clearance at least in the resting position is left between the plunger 22 and the reaction disk 30. The secure attachment of the thrust rod 24 to the piston is completed by a second ring 31 the inner periphery 31a of which bears against the first ring 26 and the outer peripheral part 31b of which bears against a bearing surface 32 of the piston 18. Moreover, a return spring 34 has a first end which bears against a component 36 securely attached to the front wall of the casing and a second end which bears against the periphery 31a of the second ring 31. It will thus be seen that, because of the presence of the second ring 31, the thrust rod 24 cannot conveniently be removed from the piston.

In European Patent Application No. 0,449,703, a booster is described corresponding to that which is shown in FIG. 1, which comprises means for adjusting the kick of the booster, that is to say the space x in FIG. 1 which exists, at rest, between the back face of the reaction disk 30 and the front face of the plunger 22. Reference may be made to the abovementioned patent application in order to have further explanations on what is meant by the kick of the booster.

It suffices to understand that, in order conveniently to adjust this kick, it would be advantageous to be able to dismount the thrust rod 24 without having to dismount the rest of the booster in order to adjust the initial value of the distance x. However, it can be seen that, in the embodiment described in FIG. 1, such a dismounting is not possible.

one object of the present invention is to provide a brake-booster of the partial vacuum type in which the dismounting of the thrust rod can easily be carried out, particularly with a view to adjusting the kick of the booster without this changing the construction of the booster in a significant manner.

In order to attain this object, the brake-booster of the partial vacuum type which comprises a casing separated into two chambers by a deformable diaphragm, a piston securely attached to the central part of said diaphragm, a reaction disk, a thrust rod disposed in said casing, means for securely attaching said thrust rod and said reaction disk to said piston and resilient means applied to said piston, is characterized in that the attachment means comprise plate-forming means securely attached to one end of the thrust rod, said plate-forming means comprising a ring-forming portion surrounding the reaction disk and interacting with said piston and a portion applied against one face of said reaction disk and having a periphery and fastening means having a part forming a bearing surface applied onto a step of said piston by said resilient means and a clipping part interacting with the periphery of the plate-forming means in such a manner that said rod and said plate-forming means can be detached from said piston by action on said clipping part.

It will be understood that the thrust rod which is securely attached to the plate-forming members can thus easily be detached from the booster piston simply by acting on the clipping parts.

Preferably, the fastening means are formed in one single piece comprising an annular part forming said bearing surface and a plurality of resiliently deformable fingers extending from said annular part and constituting said clipping part, said annular part having an inner diameter greater than the outer diameter of the plate-forming means securely attached to the thrust rod.

Figure 2:
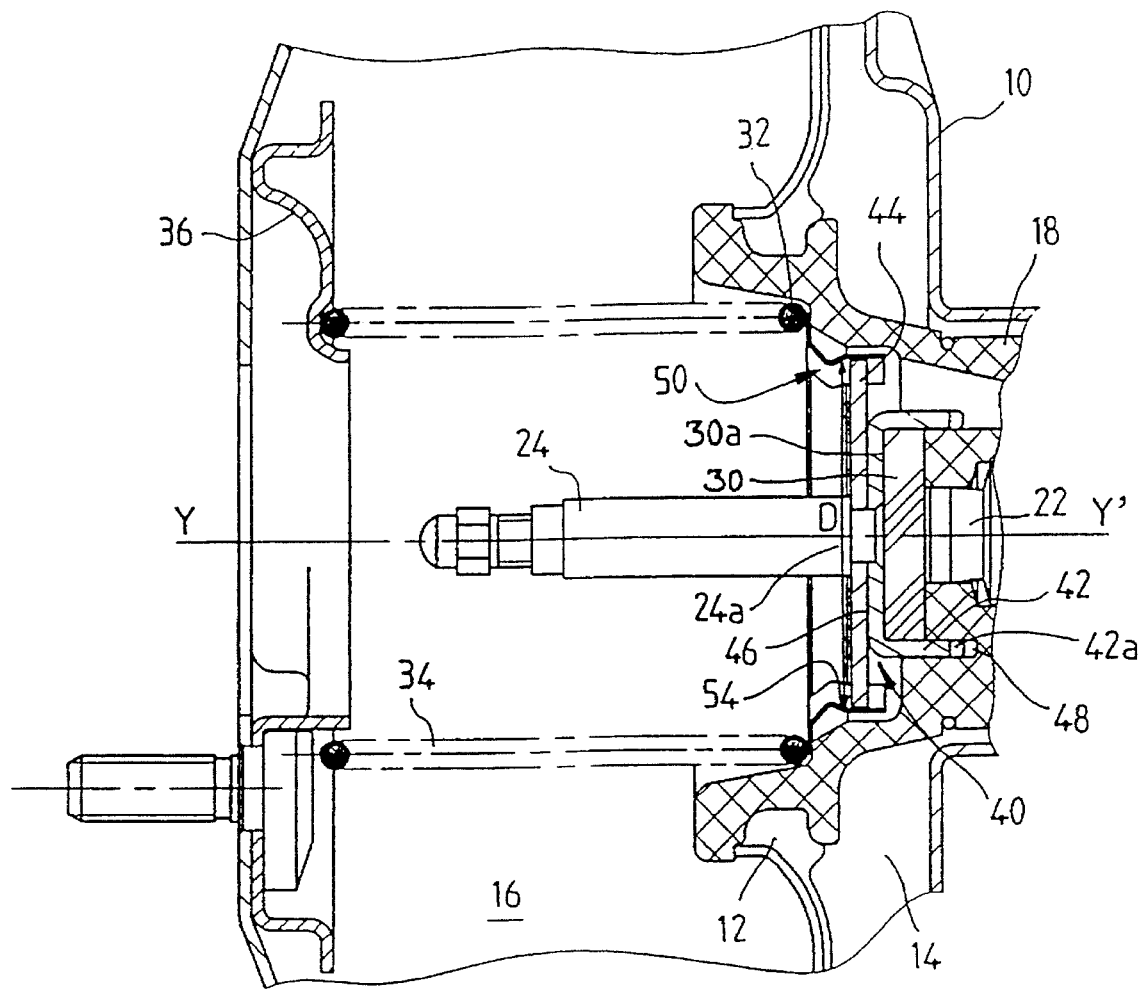
Figure 3:
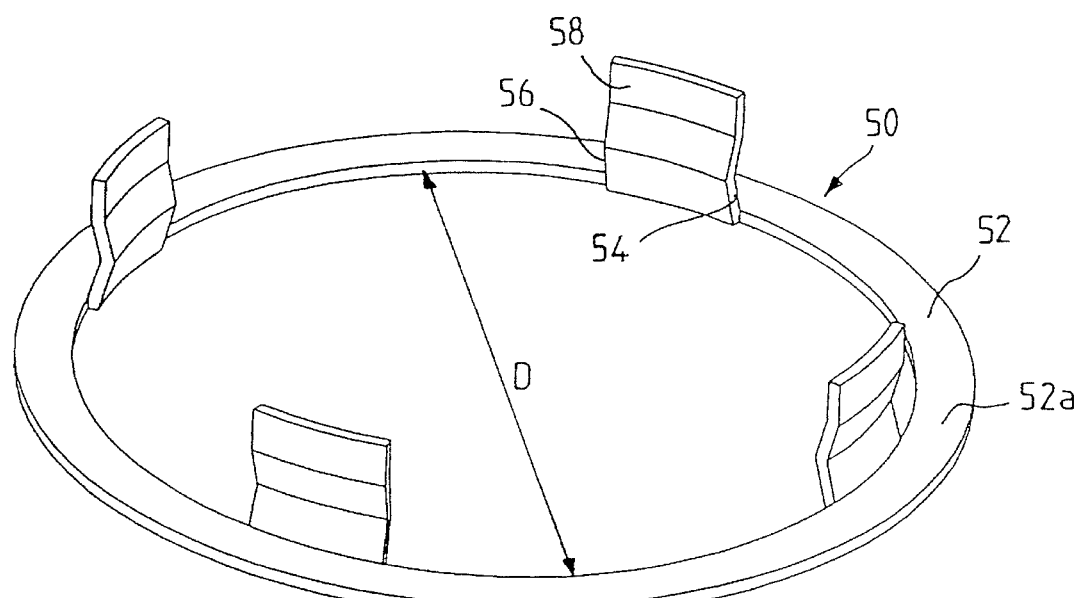

The invention will now be described by way of example with reference to the accompanying drawings in which:

FIG. 1, already described, is a view in vertical cross-section of a booster of known type;

FIG. 2 is a partial view in vertical cross-section of a booster according to the invention; and FIG. 3 is a view in perspective of the component for fastening the thrust rod onto the piston.

With reference now to FIGS. 2 and 3, a booster according to the invention will be described. In FIG. 2, the same numerical references as in FIG. 1 have been used again in order to designate the common parts. More precisely, the booster assembly is identical to that of FIG. 1 with the exception of the means for securely attaching the thrust rod 24 to the piston 18.

The means for securely attaching the thrust rod 24 to the piston 18 consist of a first assembly 40 constituted by a skirt-shaped component 42 and a component 44 in the form of a flat disk which are both securely attached to the end 24a of the thrust rod 24. The skirt-shaped component 42 comprises a bottom 46 which is applied against the front face 30a of the thrust disk 30. The skirt-shaped component 42 does of course have a free edge 42a which enters a groove 48 made in the piston. The groove 48 and the two components 42 and 44 have a symmetry of revolution about the axis YY' of the thrust rod 24. It will be understood that the interaction between the skirt-shaped component 42 and the groove 48 ensures the centering of the thrust rod 24 with respect to the piston 18. The effective secure attachment of the thrust rod to the piston is obtained with the aid of a clipping ring 50. As is more clearly apparent in FIG. 3, the ring 50 is constituted by an annular part 52 disposed in a plane orthogonal to the axis YY'. In addition, the inner diameter D of the annular part 52 is greater than the diameter D' of the component 44. From the posterior face 52a of the ring 52 project resiliently deformable clipping fingers or lugs such as 54 which extend substantially in the direction of the axis YY'. These clipping fingers comprise a bent portion 56 and an active portion 58.

Returning now to FIG. 2, it can be seen that the active portions 58 of the clipping lugs 54 bear against the periphery of the component 44; it can also be seen that the annular part 52 of the component 50 bears against the bearing surface 32 of the piston 18. As in the case of the prior booster described in connection with FIG. 1, the return spring 54 maintains the component 50 against the piston 18 during the displacements of the latter under the effect of the pressure differentials between the back chamber 14 and the front chamber 16.

It will be understood that the thrust rod 24 is thus effectively securely attached to the piston 18 and to the reaction disk 30 through the intermediary of the component 50 which, on the one hand, is securely attached to the component 44 and, on the other hand, is maintained on the bearing surface 32 of the piston by the spring 34. However, it will be understood that by acting with the aid of a tool on the clipping fingers or lugs 54 of the component 50, it is possible to extract the assembly consisting of the thrust rod 24 and the components 42 and 44 which are securely attached to it. It is then possible to proceed to the various adjustments of the booster kick which it is desirable to perform, or to proceed for example to the replacement of the reaction disk 30.

We claim:

1. A vacuum brake-booster comprising a casing separated into two chambers by a diaphragm, a piston attached securely to a central part of said diaphragm, a reaction disk, a thrust rod disposed in said casing, means for attaching securely said thrust rod and reaction disk to said piston, and resilient means applied to said piston, characterized in that the attachment means comprises plate-forming means attached securely to one end of the thrust rod, said plate-forming means comprising a ring-forming part surrounding the reaction disk and interacting with said piston and a portion applied against one face of said reaction disk and having a periphery, and fastening means having a part forming a bearing surface applied at a surface of said piston by said resilient means and a clipping part interacting with a peripheral portion of the plate-forming means so that said rod and plate-forming means can be detached from said piston by action on said clipping part.

2. The booster according to claim 1, characterized in that said ring-forming means comprises a free edge which enters a groove in said piston.

3. The booster according to claim 2, characterized in that said fastening means is formed in one single piece comprising an annular part forming said bearing surface and a plurality of resiliently deformable fingers extending from said annular part and constituting said clipping part, said annular part having an inner diameter greater than an outer diameter of the plate-forming means.

* * * * *